(12) United States Patent
Yuasa (10) Patent No.: US 9,456,104 B2
(45) Date of Patent: Sep. 27, 2016

(54) LASER SCANNING UNIT AND IMAGE FORMING APPARATUS INCLUDING THE SAME

(71) Applicant: KYOCERA Document Solutions Inc., Osaka-shi, Osaka (JP)

(72) Inventor: Yuzuru Yuasa, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/924,482

(22) Filed: Oct. 27, 2015

(65) Prior Publication Data

US 2016/0127595 A1    May 5, 2016

(30) Foreign Application Priority Data

Oct. 30, 2014   (JP) .................. 2014-221379

(51) Int. Cl.
  *G03G 15/04*   (2006.01)
  *H04N 1/04*   (2006.01)
  *G06K 15/12*   (2006.01)

(52) U.S. Cl.
  CPC ............... *H04N 1/04* (2013.01); *G06K 15/12* (2013.01)

(58) Field of Classification Search
  CPC ............. H04N 5/2254; H04N 5/2253; H04N 5/2257; H04N 5/23212; H04N 5/2252; H04N 5/23293; H04N 5/23296; H04N 5/23216; H04N 5/3696; H04N 13/0239; H04N 17/002; H04N 9/045; H04N 13/0022; H04N 13/0055; G03B 17/566; G03B 21/145; G03B 21/2046; G03B 21/208; G09G 5/026; G09G 2340/0471; G09G 2340/0478; G09G 3/3208; G09G 3/3225; G09G 3/3233; G01M 11/02; G01M 11/0228; G01M 11/088; G01M 11/37

See application file for complete search history.

(56) References Cited

U.S. PATENT DOCUMENTS

2010/0321799 A1*  12/2010  Journot ............. G02B 27/0955
                                                   359/744
2014/0036020 A1*  2/2014  Ishihara ............. G03G 15/0435
                                                   347/224

FOREIGN PATENT DOCUMENTS

JP          2011158771 A     8/2011

\* cited by examiner

*Primary Examiner* — Roy Y Yi
(74) *Attorney, Agent, or Firm* — Alleman Hall McCoy Russell & Tuttle LLP (57) ABSTRACT

A laser scanning unit includes a scanning lens, a control portion, and a storage portion. The control portion controls a light amount of a light beam emitted from a light source. The storage portion stores therein aberration characteristics representing a relationship between image heights of the scanning lens and a wavefront aberration amount, which have been obtained in advance. The control portion, when the scanning is performed, controls the light amount of the light beam in accordance with the aberration characteristics, such that the light amount is set to a predetermined first light amount, at a point of a first image height where the wavefront aberration amount has a first value, and the light amount is set to a second light amount larger than the first light amount, at a point of a second image height where the wavefront aberration amount has a second value larger than the first value.

4 Claims, 5 Drawing Sheets

LASER SCANNING UNIT AND IMAGE FORMING APPARATUS INCLUDING THE SAME

INCORPORATION BY REFERENCE

This application is based upon and claims the benefit of priority from the corresponding Japanese Patent Application No. 2014-221379 filed on Oct. 30, 2014, the entire contents of which are incorporated herein by reference.

BACKGROUND

The present disclosure relates to a laser scanning unit which includes a scanning lens that causes a light beam to form an image on a surface-to-be-scanned, and an image forming apparatus using the laser scanning unit.

A general laser scanning unit used in, for example, a laser printer, a copying machine, and the like includes a light source emitting a laser beam, a deflection member that deflects the laser beam and causes the laser beam to scan a surface-to-be-scanned, and a scanning lens that causes the deflected laser beam to form an image on a circumferential surface (surface-to-be-scanned) of a photosensitive drum. The scanning lens has a correction function that causes the laser beam to scan the surface-to-be-scanned at a constant speed.

In the laser scanning lens, it is important to scan the surface-to-be-scanned with a uniform amount of light in a main scanning direction. The scanning not performed with a uniform amount of light may result in degradation in uniformity of image density. One of factors that inhibit the scanning with a uniform amount of light is aberration of the scanning lens. A plurality of scanning lenses may be disposed in a laser scanning unit, or a laser scanning unit may be composed of a single scanning lens for the purpose of reduction in the size, cost, or the like of the unit. In the latter case, the degree of freedom in lens design is reduced, and aberration is likely to occur at a specific image height.

SUMMARY

A laser scanning unit according to an aspect of the present disclosure includes a light source, a deflection member, a scanning lens, a control portion, and a storage portion. The light source emits a light beam. The deflection member deflects the light beam emitted from the light source, and causes the light beam to scan a surface-to-be-scanned in a main scanning direction. The scanning lens causes the deflected light beam to form an image on the surface-to-be-scanned. The control portion controls a light amount of the light beam emitted from the light source. The storage portion stores therein aberration characteristics representing a relationship between image heights of the scanning lens and a wavefront aberration amount, which have been obtained in advance. The control portion, when the scanning is performed, controls the light amount of the light beam in accordance with the aberration characteristics. The control portion performs the control such that the light amount is set to a predetermined first light amount, at a point of a first image height where the wavefront aberration amount has a first value, and the light amount is set to a second light amount larger than the first light amount, at a point of a second image height where the wavefront aberration amount has a second value larger than the first value.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
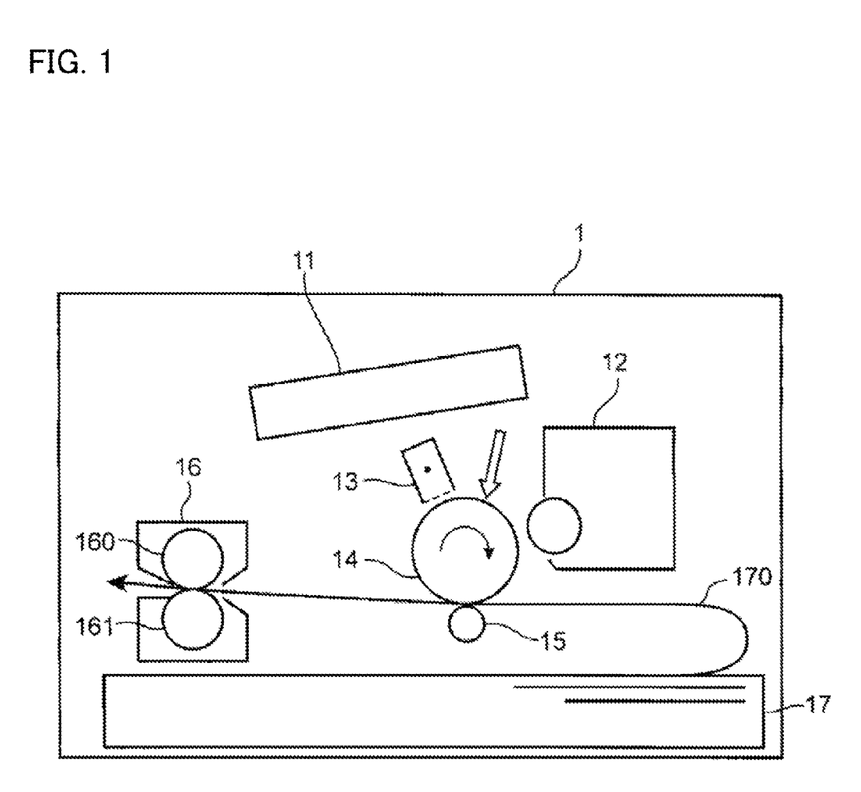
FIG. 1 is a cross-sectional view showing a schematic configuration of an image forming apparatus according to an embodiment of the present disclosure.

Hereinafter, a laser scanning unit according to one embodiment of the present disclosure is described with reference to the drawings. FIG. 1 is a cross-sectional view schematically showing a configuration of an image forming apparatus 1 including a laser scanning unit 11 according to one embodiment of the present disclosure. The image forming apparatus 1 includes the laser scanning unit 11, a developing device 12, a charging device 13, a photosensitive drum 14 (image carrier), a transfer roller 15, a fixing device 16, and a sheet feed cassette 17.

The photosensitive drum 14 is a cylindrical member, and an electrostatic latent image and a toner image are formed on a circumferential surface thereof. The photosensitive drum 14 is driven by a drive force from a motor (not shown) to be rotated in a clockwise direction in FIG. 1. The charging device 13 substantially uniformly charges the surface of the photosensitive drum 14.

The laser scanning unit 11 includes a light source such as a laser diode, a deflection member, a scanning lens, an optical element, and the like. The laser scanning unit 11 applies a laser beam according to image data, to the circumferential surface (surface-to-be-scanned) of the photosensitive drum 14 that is substantially uniformly charged by the charging device 13, thereby forming an electrostatic latent image of the image data. The laser scanning unit 11 will be described later in detail.

The developing device 12 supplies toner to the circumferential surface of the photosensitive drum 14 on which the electrostatic latent image is formed, and forms a toner image. The developing device 12 includes a developing roller that carries the toner, and a screw that conveys the toner while agitating the toner. The toner image formed on the photosensitive drum 14 is transferred onto a recording sheet that is fed from the sheet feed cassette 17 and conveyed in a conveyance path P. Toner is additionally supplied to the developing device 12 from a toner container (not shown).

The transfer roller 15 is disposed beneath the photosensitive drum 14 so as to oppose the photosensitive drum 14, and a transfer nip portion is formed between the photosensitive drum 14 and the transfer roller 15. The transfer roller 15 is formed of a rubber material or the like having electrical conductivity, and a transfer bias is applied to the transfer roller 15, whereby the transfer roller 15 transfers the toner image formed on the photosensitive drum 14, onto the recording sheet.

The fixing device 16 includes a fixing roller 160 having a heater therein, and a pressure roller 161 that forms a fixing nip portion between itself and the fixing roller 160. When the recording sheet on which the toner image is formed passes through the fixing nip portion, the toner image is fixed onto the recording sheet.

Next, an image forming operation of the image forming apparatus 1 is briefly described. First, the surface of the photosensitive drum 14 is substantially uniformly charged by the charging device 13. The charged circumferential surface of the photosensitive drum 14 is exposed by the laser scanning unit 11, whereby an electrostatic latent image of an image to be formed on a recording sheet is formed on the surface of the photosensitive drum 14. This electrostatic latent image is made visible as a toner image by supplying toner from the developing device 12 to the circumferential surface of the photosensitive drum 14. Meanwhile, a recording sheet is fed from the sheet feed cassette 17 to the conveyance path 170. The toner image is transferred onto the recording sheet when the recording sheet passes through the transfer nip portion. After the transfer operation, the recording sheet is conveyed to the fixing device 16 (the fixing nip portion), and the toner image is fixed onto the recording sheet.

Figure 2:
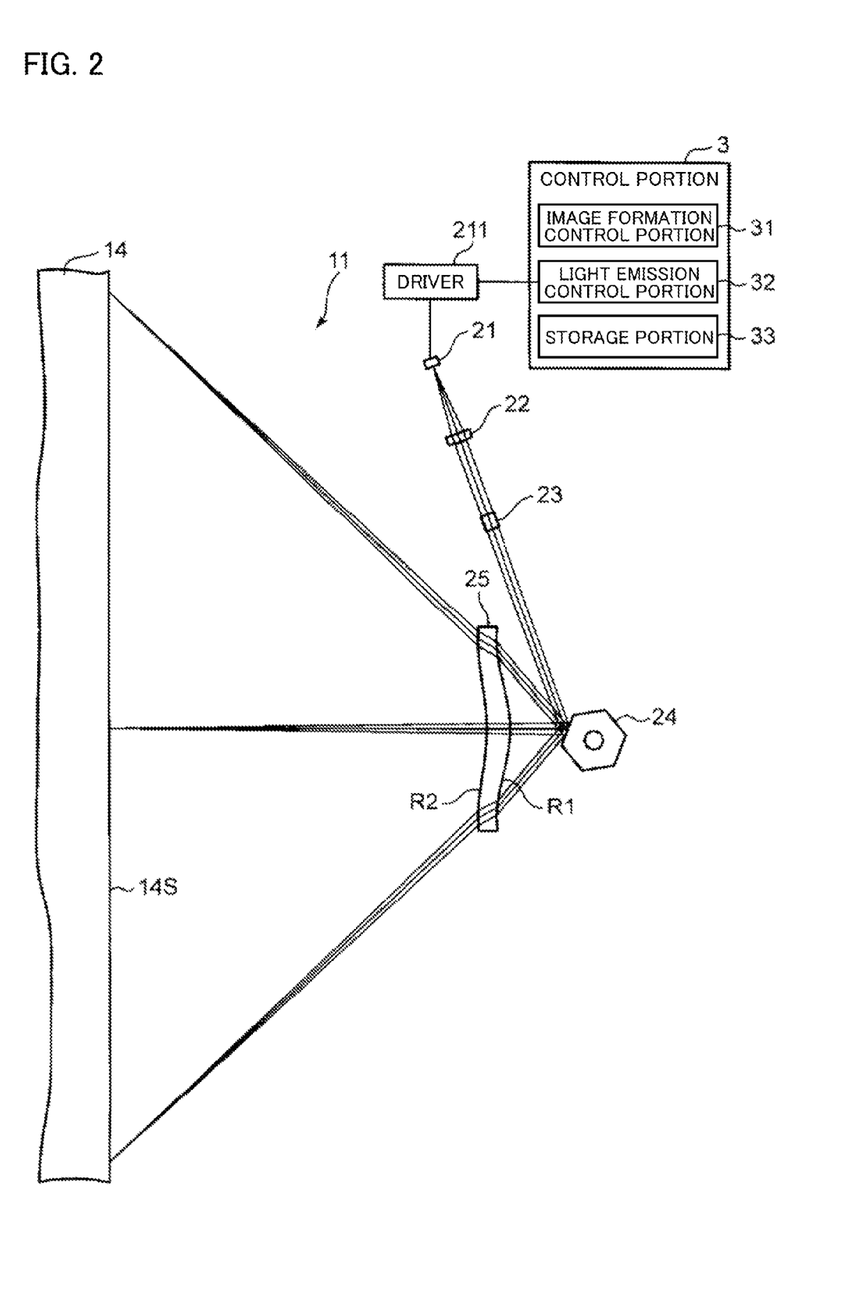
FIG. 2 is an optical path diagram showing a configuration of a main scanning cross-section of a laser scanning unit according to the embodiment.

Hereinafter, the laser scanning unit 11 is described. FIG. 2 is a plan view showing a configuration of a main scanning cross-section of the laser scanning unit 11. The laser scanning unit 11 includes a semiconductor laser 21 (light source), a collimator lens 22, a cylindrical lens 23, a polygon mirror 24 (deflection member), and a scanning lens 25. The laser scanning unit 11 of the present embodiment includes the scanning lens 25 composed of only a single lens. The operation of the laser scanning unit 11 is controlled by a control portion 3.

The semiconductor laser 21 is a light source that emits a laser beam (light beam) having a predetermined wavelength (e.g., 780 nm). The semiconductor laser 21 is driven by a driver 211 including driving circuit elements. The light amount of the laser beam emitted from the semiconductor laser 21 is determined by a drive current supplied from the driver 211 to the semiconductor laser 21.

The collimator lens 22 converts the laser beam that is emitted from the semiconductor laser 21 and diffuses, into parallel light. The cylindrical lens 23 converts the laser beam emitted from the collimator lens 22 into linear light that is long in a main scanning direction, and causes the linear light to form an image on the polygon mirror 24.

The polygon mirror 24 deflects (reflects) the laser beam emitted from the semiconductor laser 21, and causes the deflected laser beam to scan the circumferential surface 14S of the photosensitive drum 14 along the main scanning direction. The polygon mirror 24 is a polygon mirror having reflection surfaces along sides of a regular polygon, and is driven to rotate about a rotation shaft by a polygon motor (not shown). A MEMS mirror may be used instead of the polygon mirror 24. In the laser scanning unit 11 of the present embodiment, only the single scanning lens 25 is disposed between the polygon mirror 24 and the circumferential surface 14S which is a surface-to-be-scanned.

The scanning lens 25 converges the laser beam deflected by the polygon mirror 24, and causes the laser beam to form an image on the circumferential surface 14S of the photosensitive drum 14. The scanning lens 25 is a lens that has fθ characteristics, and is long in the main scanning direction. As the scanning lens 25, a lens produced by molding a translucent resin material is preferably used. The scanning lens 25 has an incident surface R1 opposing the polygon mirror 24, on which the laser beam is incident, and an exit surface R2 on the side opposite to the incident surface R1, from which the laser beam is emitted.

The laser beam emitted from the semiconductor laser 21 travels through the collimator lens 22, a diaphragm (not shown), and the cylindrical lens 23, and enters the polygon mirror 24. Thereafter, the laser beam is deflected by the polygon mirror 24 that swings about the shaft, and enters the incident surface R1 of the scanning lens 25. Then, the laser beam is emitted from the exit surface R2, and travels toward the drum circumferential surface 14S. With the rotation of the polygon mirror 24, the laser beam scans the drum circumferential surface 14S from an off-axis position in a negative direction on a scanning area to an off-axis position in a positive direction on the scanning area.

The control portion 3 controls the operation of the entire image forming apparatus 1 including the laser scanning unit 11. The control portion 3 is composed of a microcomputer including a storage portion such as a ROM in which a control program is stored or a flash memory in which data is temporarily stored, for example. By causing the microcomputer to read the control program, the control portion 3 operates to functionally have an image formation control portion 31, a light emission control portion 32 (control portion), and a storage portion 33.

The image formation control portion 31 controls the operations of the respective portions of the image forming apparatus 1 to cause the image forming apparatus 1 to execute the above-mentioned image forming operation. This control includes: control for rotation of the polygon mirror 24 of the laser scanning unit 11; control for on/off of the charging device 13; control for axial rotation of the photosensitive drum 14; and control for application of the developing bias, the transfer bias, and the like.

The light emission control portion 32 controls the operation of the driver 211 in order to control the light amount of the laser beam emitted from the semiconductor laser 21. Specifically, the light emission control portion 32 controls a drive current that is applied to the semiconductor laser 21 by the driver 211. The drive current is modulated in accordance with a change in a wavefront aberration amount in the main scanning direction of the scanning lens 25, when one scanning line is rendered on the circumferential surface 14S of the photosensitive drum 14.

In the case where no wavefront aberration exists in the scanning lens 25, a drive current that causes the semiconductor laser 21 to output a laser beam corresponding to a light amount required for normal exposure of the circumferential surface 14S is defined as a basic drive current A. The light emission control portion 32 sets a drive current A+ΔA, which is obtained by adding the basic drive current A and a correction drive current ΔA that is determined based on a wavefront aberration amount at each image height of the scanning lens 25, in accordance with the image height. When one scanning line is rendered, the light emission control portion 32 controls the driver 211 so that a drive current A+ΔA(Y) according to an image height Y is applied to the semiconductor laser 21.

Basically, the current modulation is performed so that the correction drive current ΔA is set to be relatively large for an image height at which the wavefront aberration amount is relatively large. For example, at a point Y1 of a first image height at which the wavefront aberration amount has a first value, a predetermined drive current A+ΔA1(Y1) is set, and the semiconductor laser 21 is caused to emit a predetermined first light amount I1(Y1). On the other hand, at a point Y2 of a second image height at which the wavefront aberration amount has a second value larger than the first value, a drive current A+ΔA2(Y2) is set in which the correction drive current is ΔA2(Y2) larger than ΔA1(Y1), and the semiconductor laser 21 is caused to emit a second light amount I2(Y2) larger than the first light amount I1(Y1).

The storage portion 33 stores therein aberration characteristics representing the relationship between the image height of the scanning lens 25 and the wavefront aberration amount. The aberration characteristics can be calculated from a lens design value of the scanning lens 25. Of course, the aberration characteristics may be obtained by actual measurement. Data of the aberration characteristics obtained by calculation or actual measurement is stored in the storage portion 33. The light emission control portion 32 sets the drive current A+AA(Y) with reference to the data stored in the storage portion 33.

Figure 3A:
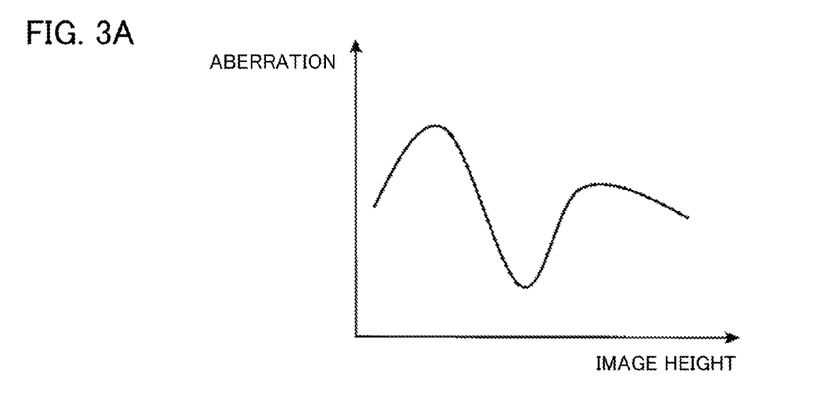
FIGS. 3A, 3B, and 3C are graphs schematically showing a relationship between an image height of a scanning lens and aberration thereof, a relationship between the image height and an amount of a light beam, and a relationship between the image height and an image density, respectively.
Figure 3B:
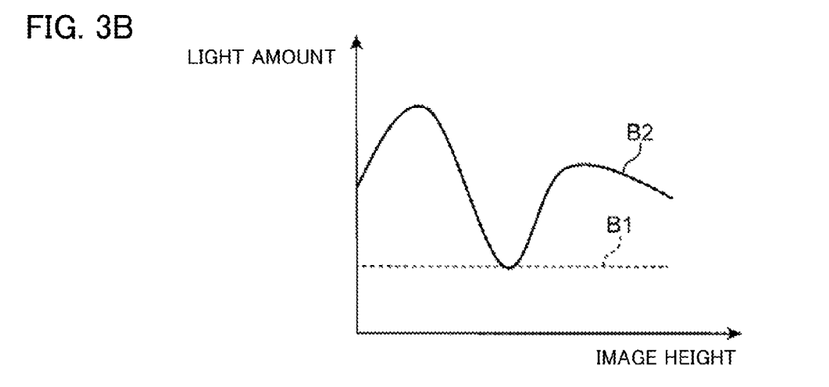
Figure 3C:
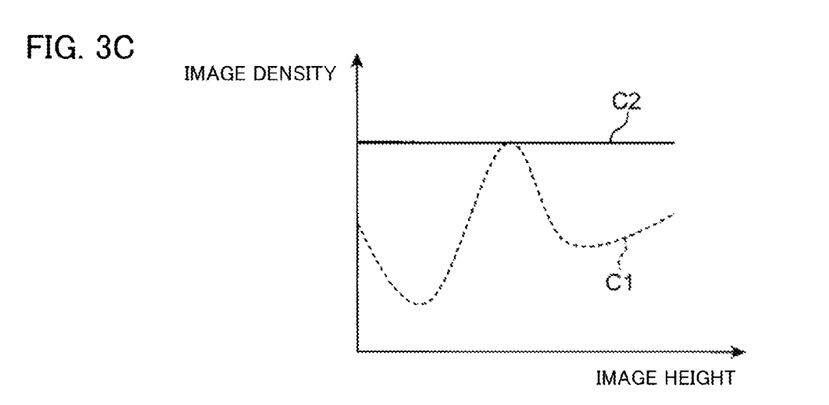

The significance of providing the light emission control portion 32 and the storage portion 33 in the present embodiment is described based on FIGS. 3A to 3C. FIG. 3A, FIG. 3B, and FIG. 3C are graphs schematically showing the relationship between the image height of the scanning lens 25 and the wavefront aberration (aberration characteristics) thereof, the relationship between the image height and the light amount of the laser beam, and the relationship between the image height and the image density, respectively. FIG. 3C shows the image density of a halftone image that is highly sensitive to the light amount.

As shown in FIG. 3A, generally, wavefront aberration exists in the scanning lens 25. The shapes of the lens surfaces, i.e., the incident surface R1 and the exit surface R2, of the scanning lens 25 are designed so that desired optical characteristics are achieved and aberration is avoided as much as possible. However, aberration occurs unavoidably. In particular, when the scanning optical system is composed of the single scanning lens 25 as in the present embodiment, the degree of freedom in designing the scanning lens 25 is small, and therefore, large aberration is likely to occur at a specific image height.

It is assumed that, on the scanning lens 25 having such aberration characteristics, a laser beam having a uniform light amount over all image heights enters the incident surface R1 as shown by a line B1 in FIG. 3B. In this case, the image density of an image formed based on a scanning line rendered by the laser beam on the surface-to-be-scanned is not uniform but varies as shown by a line C1 in FIG. 3C. The line C1 shows density characteristics obtained by roughly inverting the aberration characteristics shown in FIG. 3A. That is, the image density is relatively low at an image height having relatively large wavefront aberration, and the image density is relatively high at an image height having relatively small wavefront aberration. This is caused by that the light amount of the main lobe of the laser beam is reduced due to the wavefront aberration.

That is, the laser beam emitted from the semiconductor laser 21 has a beam spot. This beam spot includes a main-lobe area that is near the center of the beam spot and has a large power, and a side-lobe area that is outside the main lobe and has a small power. The laser beam that has passed through a portion of the scanning lens where the wavefront aberration is large, has a tendency that the side lobe of the laser beam is increased. Since the main-lobe area having directivity contributes to image dot formation, such an increase in the side lobe results in a decrease in the light amount of the main lobe. Therefore, the image rendered by the light beam that has passed through the portion where the wavefront aberration is large is significantly reduced in density. Thus, the scanning lens having the aberration characteristics shown in FIG. 3A causes the density distribution shown by the line C1 in FIG. 3C.

In order to solve the above drawback, the magnitude of the light amount may be adjusted in accordance with the magnitude of the wavefront aberration. That is, at the point of the image height where the wavefront aberration amount is relatively large, the light amount of the laser beam incident on the scanning lens may be set to be relatively large. Thereby, the reduction in the light amount of the main lobe, which has been caused by the wavefront aberration, can be compensated for. Specifically, as shown by a line B2 in FIG. 3B, the light amount is changed for each image height in accordance with the aberration characteristics shown in FIG. 3A. Substantially, in accordance with the aberration characteristics, the light mount for each image height is determined to a light amount obtained by adding a correction light amount proportional to the magnitude of the wavefront aberration to a basic light amount required when no wavefront aberration exists. By modulating (correcting) the light amount at each image height as shown by the line B2, the image density can be made uniform over all image heights as shown by a line C2 in FIG. 3C.

As described above, according to the present embodiment, even when wavefront aberration exists in the scanning lens, nonuniformity of the image density can be corrected by modulating the light amount from the semiconductor laser 21 (by modulating the drive current). This leads to elimination of the need for using a high-performance scanning lens in which wavefront aberration is avoided as much as possible, in the present embodiment. As an evaluation value for wavefront aberration, a PV (Peak-Valley) value of wavefront aberration may be used. A PV value of wavefront aberration indicates the degree of deviation of a light beam having a certain wavelength from an ideal wavefront. Generally, when the wavelength of the light beam is expressed as $\lambda$, a lens having a wavefront aberration PV value equal to or smaller than $\lambda/8$ is evaluated as a lens having satisfactorily small wavefront aberration. Of course, in a general laser scanning unit, it is recommended to use the lens having such a small level of wavefront aberration, as a scanning lens.

On the other hand, in the present embodiment, there is substantially no problem even if a lens having a wavefront aberration PV value exceeding $\lambda/8$ is used as the scanning lens 25, in contrast to the above-mentioned recommended case. The lens having the PV value exceeding $\lambda/8$ is excellent in productivity and low in cost, although having large wavefront aberration. According to the present embodiment, even when such a lens is used as the scanning lens 25, it is possible to scan the surface-to-be-scanned (circumferential surface 14S) with a uniform light amount in the main scanning direction.

Hereinafter, a specific example that satisfies the requirements of the laser scanning unit 11 according to the above-mentioned embodiment is described. A scanning optical system according to the example has a configuration in which the collimator lens 22, the cylindrical lens 23, the polygon mirror 24, and the single scanning lens 25 are arranged in order from the semiconductor laser 21 side, as shown in FIG. 2. The surface shapes of the first surface R1 and the second surface R2 of the scanning lens 25 are as shown in Table 1.

TABLE 1

| R1 SURFACE | | | | R2 SURFACE | | | |
|---|---|---|---|---|---|---|---|
| Rm | −2.21E+01 | Rs0 | 8.76E+00 | Rm | −2.15E+01 | Rs0 | −6.82E+00 |
| Ky | −7.26E+00 | Kx | 0.00E+00 | Ky | −6.82E+00 | Kx | −5.92E−01 |
| A1 | 0.00E+00 | B1 | 2.61E−02 | A1 | −2.81E−03 | B1 | 4.82E−03 |
| A2 | 1.95E−03 | B2 | 2.47E−02 | A2 | 3.94E−03 | B2 | 1.37E−02 |
| A3 | 0.00E+00 | B3 | −5.96E−06 | A3 | 2.38E−06 | B3 | −2.23E−05 |
| A4 | 2.01E−06 | B4 | 1.89E−04 | A4 | 1.66E−06 | B4 | −2.12E−06 |
| A5 | 0.00E+00 | B5 | 4.12E−08 | A5 | −4.64E−10 | B5 | 2.21E−09 |
| A6 | −4.12E−10 | B6 | −4.54E−07 | A6 | −9.58E−11 | B6 | −7.95E−10 |
| A7 | 0.00E+00 | B7 | 4.50E−11 | A7 | 0.00E+00 | B7 | 3.13E−12 |
| A8 | 3.19E−14 | B8 | 1.13E−09 | A8 | 4.54E−14 | B8 | −7.51E−13 |
| A9 | 0.00E+00 | B9 | 0.00E+00 | A9 | 0.00E+00 | B9 | 0.00E+00 |
| A10 | 0.00E+00 | B10 | −7.65E−13 | A10 | 0.00E+00 | B10 | 1.97E−16 |

On Table 1, the surface shape of the incident surface R1 of the scanning lens 25 is shown in the column of "R1 SURFACE", and the surface shape of the exit surface R2 of the scanning lens 25 is shown in the column of "R2 SURFACE". In Table 1, Rm indicates a main scanning curvature radius, Rs indicates a sub scanning curvature radius, Ky indicates a main scanning conic coefficient, Kx indicates a sub scanning conic coefficient, An (n: integer) indicates a higher-order coefficient of the surface shape in the main scanning direction, and Bn (n: integer) indicates a higher-order coefficient of the surface shape in the sub scanning direction.

The surface shapes of the incident surface R1 and the exit surface R2 are each defined by the following equation expressing a sag amount, by use of a local orthogonal coordinate system (x,y,z) having an origin at the vertex of the surface, an x axis indicating the sub scanning direction, a y axis indicating the main scanning direction, and a positive z axis (optical axis direction) indicating a direction toward the circumferential surface 14S. However, Zm (main scanning direction) and Zs (sub scanning direction) each indicate a displacement (with respect to the surface vertex) in the z axis direction at a position of height y, and y indicates a height ($Y^2 = x^2 + y^2$) in a direction perpendicular to the z axis.

[Formula 1]

$$Sag = z_m + z_s$$

$$z_m = \frac{C_m Y^2}{1 + \sqrt{1 - (1 + k_y) C_m^2 Y^2}} + \sum_{i=1}^{10} A_i Y^i$$

$$z_s = \frac{C_s X^2}{1 + \sqrt{1 - (1 + k_x) C_s^2 X^2}}$$

$$C_s = \frac{1}{R_s}$$

$$R_s = R_{s0} + \sum_{i=1}^{10} B_i Y^i$$

Figure 4:
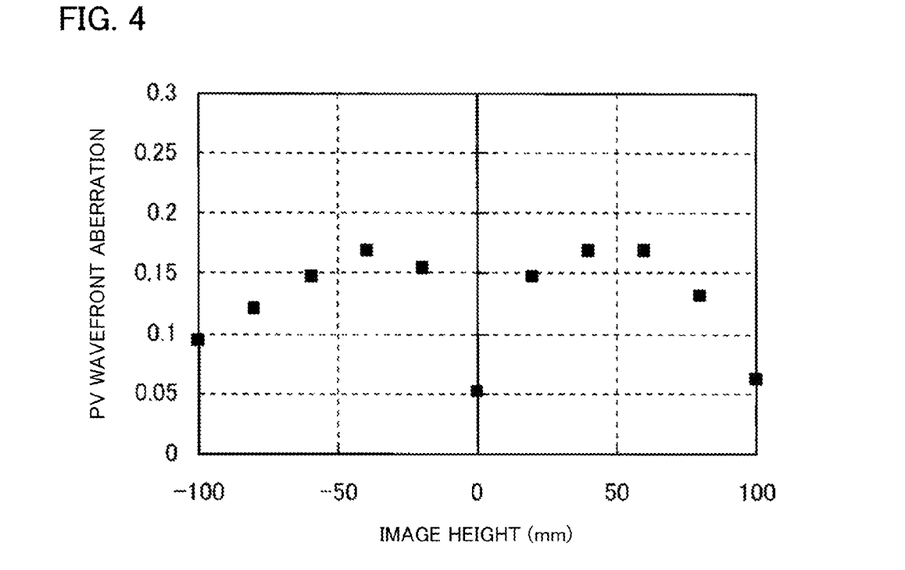
FIG. 4 is a graph showing a wavefront aberration amount at each image height, of a scanning lens used in a specific example.

FIG. 4 is a graph showing PV wavefront aberration (wavefront aberration amount) at each image height Y, which is obtained when the circumferential surface 14S is scanned in the main scanning direction by the scanning lens 25 of the above-mentioned example. In this graph, intrinsic aberration (aberration that appears uniformly over all image heights) which does not adversely affect convergence of the light beam is excluded. It is found from FIG. 4 that, in the scanning lens 25 having the construction data shown in Table 1, the PV wavefront aberration increases with a peak around the image height of ±40 mm. If scanning is performed with a laser beam having a uniform light amount over all image heights of the scanning lens 25, convergence is particularly degraded near the image height of ±40 mm, resulting degradation of the image density. Particularly in a halftone image that is highly sensitive to a change in the light amount, image unevenness remarkably appears.

In the present embodiment, in order to secure uniformity of image density, the light emission control portion 32 corrects the light amount of the laser beam in accordance with the wavefront aberration characteristics shown in FIG. 4. Specifically, when the light amount at the image height Y on the surface-to-be-scanned is expressed as I(Y) and the wavefront aberration amount at the image height Y on the surface-to-be-scanned is expressed as η(Y), the light emission control portion 32 sets a light amount I(Y$_0$) at an image height Y$_0$ and the light amount I(Y) so that the relationship expressed by the following equation (1) is satisfied with respect to the image height Y$_0$ at which the wavefront aberration amount is minimized.

[Formula 2]

$$\frac{I(Y) - I(Y_0)}{I(Y_0)} = \alpha \frac{\eta(Y) - \eta(Y_0)}{\eta(Y_0)} \quad (1)$$

where α satisfies α>0, and indicates a function of the wavefront aberration amount η(Y).

In the wavefront aberration characteristics shown in FIG. 4, the image height Y$_0$ at which the PV wavefront aberration is minimized is a point where the image height is 0 mm. Therefore, first, the light amount I(Y$_0$) with which a predetermined image density can be achieved is determined based on the PV wavefront aberration at the point where the image height is 0 mm. Then, the parameter a is set to an appropriate value, and the light amount I(Y) at each image height Y is determined by use of the above equation (1). Thus, by adjusting the parameter a, adverse effect of the wavefront aberration at all image heights can be appropriately reduced by controlling the light amount.

Figure 5:
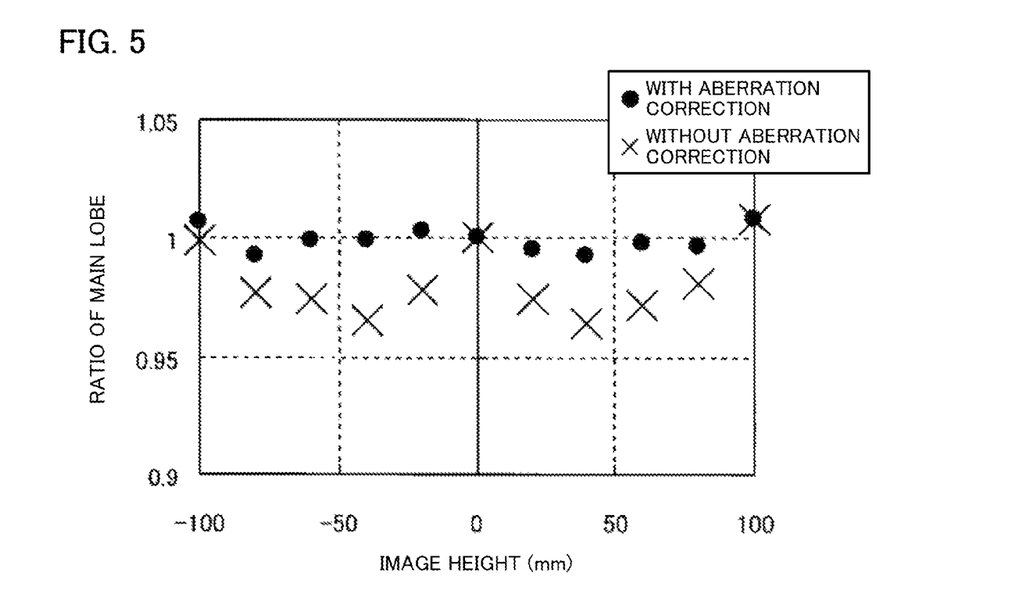
FIG. 5 is a graph showing a relationship between each image height and a ratio of a main lobe of a light beam, according to the example.

In order to confirm the effect of the above-mentioned light amount correction, a ratio of the main lobe in the beam spot of the laser beam is evaluated for each image height. FIG. 5 is a graph showing the relationship between the image height and the ratio of the main lobe, in the scanning lens 25 according to the example. The ratio of the main lobe is defined as follows. That is, in a profile of light intensity of a beam spot formed on the circumferential surface 14S, a predetermined threshold is set for the light intensity, and the ratio of the main lobe is defined as a ratio of the amount of energy in an area where the light intensity is equal to or larger than the threshold, to the amount of energy in the entire profile. In FIG. 5, the ratio of the main lobe at each image height is normalized by the ratio of the main lobe at the point where the image height is 0 mm and the wavefront aberration amount is minimized in the wavefront aberration characteristics shown in FIG. 4.

In FIG. 5, plots of crosses (x) represent the ratio of the main lobe in the case where aberration correction is not performed, i.e., in the case where the circumferential surface 14S is scanned with a constant light amount without performing the above-mentioned light amount correction. In this case, at the point where the image height is ±40 mm and the wavefront aberration is large, the ratio of the main lobe is reduced by about 4% with respect to the reference point where the image height is 0 mm.

Figure 6:
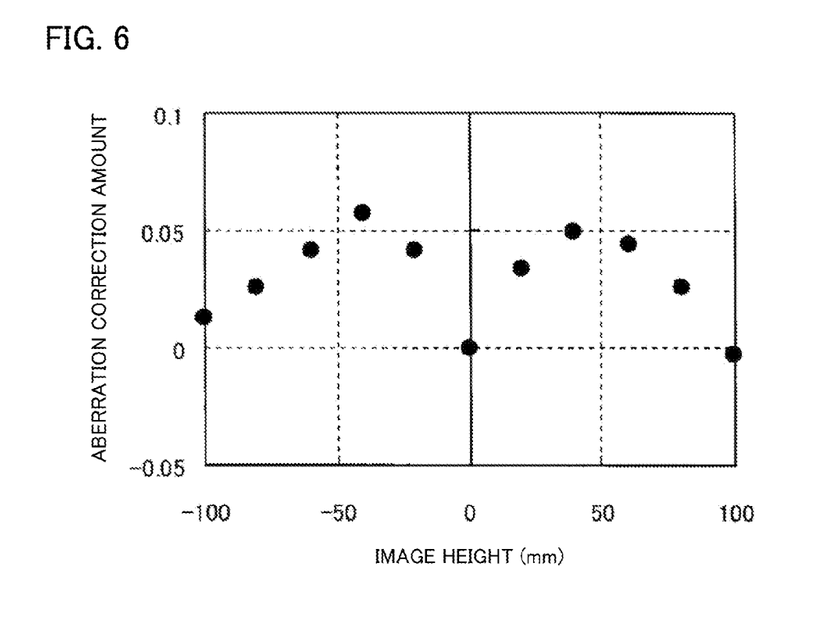
FIG. 6 is a graph showing a relationship between each image height and an aberration correction amount, according to the example.

On the other hand, plots of black circles (•) in FIG. 5 represent the ratio of the main lobe in the case where the circumferential surface 14S is scanned while the light emission control portion 32 performs the light amount correction for each image height based on the above equation (1). FIG. 6 is a graph showing the relationship between the image height and the aberration correction amount, which is the basis of the light amount correction. In FIG. 6, the vertical axis corresponds to the value on the right side of the above equation (1). In the equation (1), the parameter a is set to 29.61. It is confirmed that, by correcting the light amount of the laser beam for each image height in accordance with the aberration correction shown in FIG. 6, variation in the ratio of the main lobe with respect to the image height can be reduced to a non-problematic level in practical use (a level at which unevenness of image density is not visually recognized), as shown by the plots of black circles (•) in FIG. 5.

According to the laser scanning unit 11 of the present embodiment described above, the light emission control portion 32 controls the light amount to be relatively large at a point of an image height where the wavefront aberration amount of the scanning lens 25 is relatively large, whereby reduction in the light amount of the main lobe due to wavefront aberration can be corrected. Therefore, even when the scanning lens 25 having aberration is used, it is possible to allow the scanning lens 25 to scan the surface-to-be-scanned with a uniform light amount in the main scanning direction. Thus, when the laser scanning unit 11 is applied to an image forming apparatus, it is possible to allow the image forming apparatus to form a high-quality image having no density unevenness.

Further, in the laser scanning unit 11 of the present embodiment, only one scanning lens 25 is disposed between the polygon mirror 24 (deflection member) and the circumferential surface 14S (surface-to-be-scanned). When a scanning optical system includes a single-piece scanning lens, size reduction of the optical system and reduction in the number of optical elements can be achieved. On the other hand, in the case of using the single-piece scanning lens, the degree of freedom in designing the lens is small, and aberration is likely to occur at a specific image height as shown in FIG. 4. However, according to the present embodiment, adverse effect of the wavefront aberration of the scanning lens can be canceled by the above-mentioned light amount correction in which the light amount of the laser beam is controlled based on the aberration characteristics of the scanning lens 25. Therefore, even when such a scanning optical system composed of a single-piece scanning lens is positively adopted, it is possible to allow the scanning lens to scan the surface-to-be-scanned with a uniform light amount in the main scanning direction.

Although the embodiment of the present disclosure has been described above, the present disclosure is not limited to the above embodiment, and various modifications can be made. For example, in the above embodiment, only one scanning lens 25 is disposed between the polygon mirror 24 and the circumferential surface 14S. However, a plurality of scanning lenses may be disposed between the deflection member and the surface-to-be-scanned. In this case, the above-mentioned light amount correction may be performed so as to correspond to wavefront aberration of at least one scanning lens.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning unit comprising:
a light source configured to emit a light beam;
a deflection member configured to deflect the light beam emitted from the light source, and cause the light beam to scan a surface-to-be-scanned in a main scanning direction;
a scanning lens configured to cause the deflected light beam to form an image on the surface-to-be-scanned;
a control portion configured to control a light amount of the light beam emitted from the light source; and
a storage portion configured to store therein aberration characteristics representing a relationship between image heights of the scanning lens and a wavefront aberration amount thereof, which have been obtained in advance, wherein
the control portion, when the scanning is performed, controls the light amount of the light beam in accordance with the aberration characteristics, and the control portion performs the control such that the light amount is set to a predetermined first light amount, at a point of a first image height where the wavefront aberration amount has a first value, and the light amount is set to a second light amount larger than the first light amount, at a point of a second image height where the wavefront aberration amount has a second value larger than the first value, and wherein
when the light amount at an image height Y on the surface-to-be-scanned is expressed as I(Y) and the wavefront aberration amount at the image height Y on the surface-to-be-scanned is expressed as η(Y), the control portion sets the light amount I(Y) so that a relationship expressed by the following equation (1) is satisfied with respect to an image height $Y_0$ at which the wavefront aberration amount is minimized:

$$\frac{I(Y) - I(Y_0)}{I(Y_0)} = \alpha \frac{\eta(Y) - \eta(Y_0)}{\eta(Y_0)}$$

where α satisfies α>0, and indicates a function of the wavefront aberration amount η(Y).

2. The laser scanning unit according to claim 1, wherein only a single piece of the scanning lens is disposed between the deflection member and the surface-to-be-scanned.

3. The laser scanning unit according to claim 1, wherein when a wavelength of the light beam is expressed as λ, the scanning lens is a lens having a PV value of wavefront aberration, which is equal to or larger than λ/8.

4. An image forming apparatus comprising:
an image carrier configured to carry an electrostatic latent image; and
the laser scanning unit according to claim 1, configured to apply a light beam to a circumferential surface of the image carrier, as the surface-to-be-scanned.

\* \* \* \* \*